United States Patent [19]

Hollander

[11] Patent Number: 4,990,753
[45] Date of Patent: Feb. 5, 1991

[54] SHEATH LOCK MEANS FOR HEATED HANDGRIP

[76] Inventor: James M. Hollander, HC 64 Box 242, Lebanon, N.H. 03766

[21] Appl. No.: 522,636

[22] Filed: May 14, 1990

Related U.S. Application Data

[63] Continuation-in-part of Ser. No. 229,271, Aug. 8, 1988, Pat. No. 4,937,429.

[51] Int. Cl.$^5$ ............................................. H05B 3/18
[52] U.S. Cl. ..................................... 219/505; 219/204; 219/542; 219/546; 219/522; 338/252; 338/303; 74/551.9
[58] Field of Search ............... 219/202, 200, 204, 203, 219/505, 522, 542, 546; 338/303, 265, 268, 252; 74/551.9

[56] References Cited

U.S. PATENT DOCUMENTS

| 2,379,530 | 7/1945 | Lederer | 338/303 |
| 3,970,823 | 7/1976 | Volk, Jr. | 219/546 |
| 4,471,209 | 9/1984 | Hollander | 219/204 |

FOREIGN PATENT DOCUMENTS

| 2254204 | 7/1975 | France | 219/204 |
| 0530836 | 2/1955 | Italy | 219/204 |
| 0411612 | 6/1934 | United Kingdom | 338/303 |
| 0571069 | 8/1945 | United Kingdom | 219/204 |

Primary Examiner—M. H. Paschall
Attorney, Agent, or Firm—Bachman & LaPointe

[57] ABSTRACT

A heated handgrip is disclosed wherein a tubular sleeve is overlayed by a sheath with a heating wire sandwiched between the sleeve and the sheath.

The sheath and the sleeve are connected threadedly and lock means are provided to preclude relative motion between the sheath and the sleeve.

6 Claims, 1 Drawing Sheet

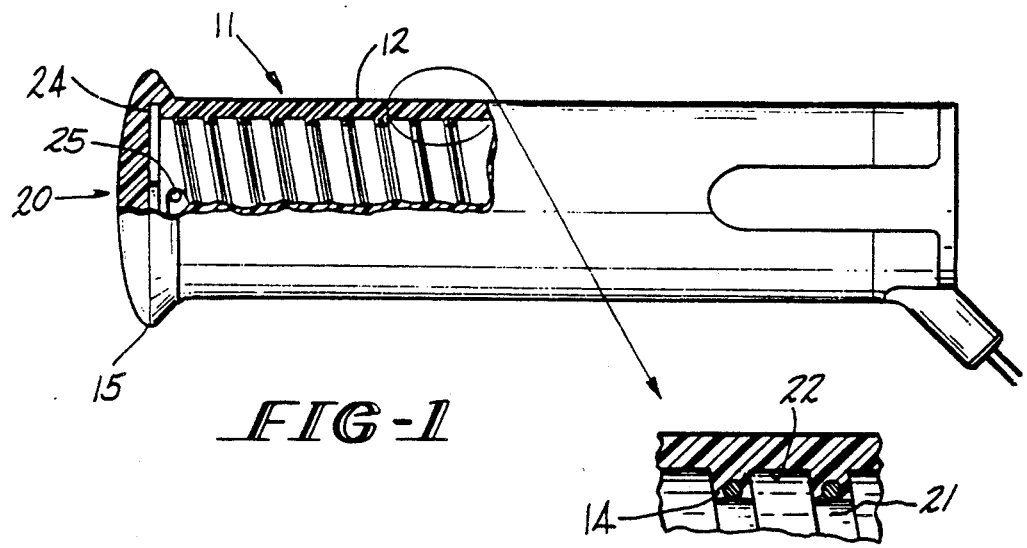
FIG-1
FIG-2
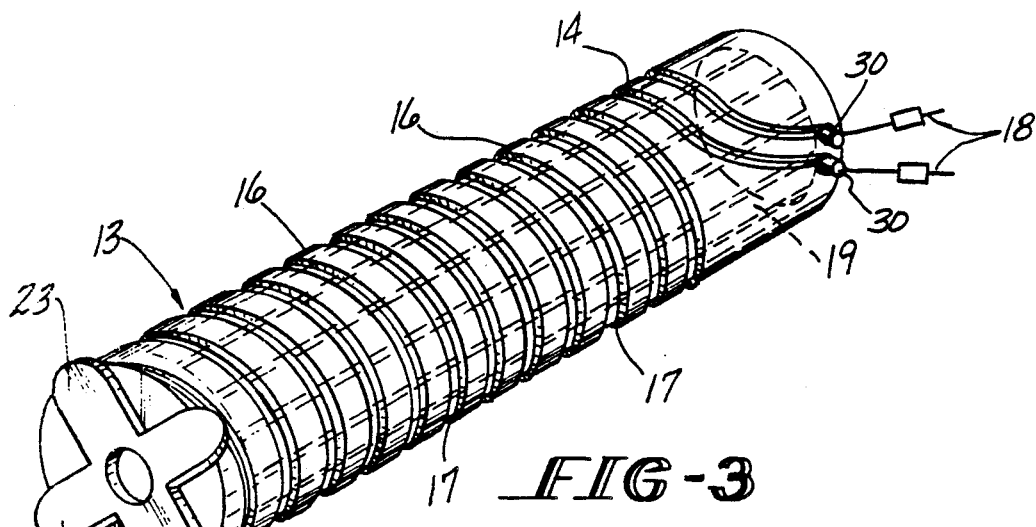
FIG-3
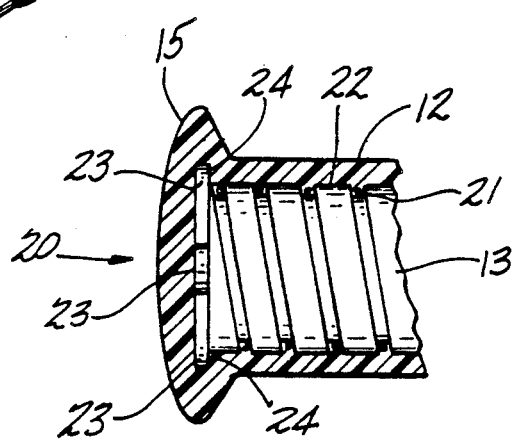
FIG-4

SHEATH LOCK MEANS FOR HEATED HANDGRIP

RELATED APPLICATION

This application is a continuation-in-part of Application SN 229,271, filed Aug. 8, 1988 by James M. Hollander, entitled HEATED HAND GRIPS AND METHOD OF MANUFACTURE, now U.S. Pat. No. 4,937,429, issued June 26, 1990.

BACKGROUND OF THE INVENTION

In the prior '429 patent, a heated handgrip for a vehicle, such as a recreational vehicle, snowmobile, motorcycle and the like, is disclosed in which a wire heating element extends throughout spiral grooves in a land and groove configuration formed on the exterior of a tubular core or sleeve.

A complementary sheath overlays the sleeve and forms the exterior of the handgrip and defines the portion of the grip which is grasped by an operator.

It has been found that although the handgrip disclosed and claimed in the '429 patent is operative, there are certain deficiencies therein.

For example, since the sleeve and the sheath have mating helical land and groove configurations, i.e., spiral lands and grooves or the exterior of the sleeve mating with complementary spiral lands and grooves on the interior of the sheath, there is a tendency for the sheath to separate from the sleeve.

That is, the sheath rotates relative to the sleeve in the fashion of a jackscrew with the result that the sheath and sleeve are displaced relative to one another. Obviously this occurrence is undesirable because it degrades the utility of the grip. Furthermore, since screw action disturbs the placement of the heating wire, there is a danger of short circuits.

In addition, it is desirable to have the resistance wire thoroughly sandwiched between the grooves of the sleeve and the lands of the sheath.

That is, the sleeve is usually molded in a separate operation of a thermoplastic material such as (but not limited to) acrylonitrile-butadiene-styrene copolymer or nylon. Thereafter the resistance wire is wound upon the sleeve. Following that step, the sheath is molded about the wired sleeve using a vulcanizable elastomeric material such as (but not limited to) compounded polymers or copolymers of butadiene or neoprene which create a comfortable grip.

SUMMARY OF THE INVENTION

Consequently, it is a primary feature of the present invention to provide a handgrip within the above general class wherein there is no possibility of separation between the sleeve and the sheath.

A further feature of the invention is the provision of a lock means for blocking relative motion between the sleeve and the sheath.

More particularly, at least one protuberance is molded integrally with one of the sleeve or the sheath received in a recess in the other of the sleeve and the sheath so that an interlock is formed between these two members which precludes relative rotation.

In the alternative and depending upon the molding materials utilized, the interlock can be developed between the sleeve and the sheath by relying on thermal fusion.

For example, if the sleeve is molded of a thermoplastic material such as polypropylene and the sheath is molded of a thermoplastic rubber adhesion between the two materials is sufficient, in many cases, to block relative motion without a lock means.

In a further alternative a spray-on or paint-on adhesive may be applied to the wire wound sleeve prior to molding the outer sheath to block relative rotation without using a lock means.

Nevertheless, it is to be understood that in some cases overheating, violent or severe service may reduce the effectiveness of the thermal adhesive or the effectiveness of the adhesive created by a paint on or spray on compound.

Therefore, to provide complete insurance against relative motion in all types of weather, service or use, it is necessary to incorporate a positive lock means in the handgrip.

A handgrip device embracing certain features of the present invention may comprise an inner sleeve, an outer protective sheath, a bare heating wire disposed between the sheath and the sleeve, the inner sleeve being formed on its exterior surface with a first pattern of continuous helical lands and grooves, the outer sheath being formed on its interior surface with a second pattern of continuous helical lands and grooves, the land and grooves of the first and second patterns being threadedly engaged whereby said sheath and said sleeve are relatively rotatable and separable, and lock means incorporated in said handgrip whereby said relative rotation is precluded.

A method of fabricating a laminated heated handgrip device having a heating element embedded therein enhancing certain other features of the present invention may comprise the steps providing an inner relatively rigid sleeve of thermoplastic material having an internal surface formed with a plurality of longitudinal striations and an external surface formed with a first continuous pattern of helical lands and grooves, disposing a bare heating wire in the groove of said first pattern, and molding an outer sheath of vulcanizable material over the sleeve and over the heating wire whereby said vulcanizable material is received in said grooves, and vulcanizing the molded sheath whereby the sheath and the sleeve are fused precluding relative motion therebetween.

Other features and advantages of the present invention will become more apparent from an examination of the succeeding specification when read in conjunction with the appended drawings, in which;

FIG. 1 is a side view of the handgrip of the present invention with a portion broken away for clarity, FIG. 2 is an enlargement of a portion of FIG. 1, FIG. 3 is a perspective view of the sleeve element of the handgrip of the present invention, and FIG. 4 is a sectional view of a portion of the left end of the illustration of FIG. 1 enlarged to show the locking means.

Referring to the drawings, the reference numeral 11 designates a heated handgrip having a sheath 12 and a flange 15 overlaying a tubular sleeve 13 with a bare heating wire disposed in the grooves of a helical pattern of lands and grooves.

As disclosed and described in said copending application the wire 14 is looped about pin 25 and its ends extend to and are wound about terminal pins 30. Bitter ends of the wire 14 are connected to leads 18 in turn connected to a source of power not shown.

The sleeve 13 includes an internal surface having longitudinal striations at 19 and an external surface defining a first continuous pattern of lands 16 and grooves 17 with a bare heating wire 14 disposed, in the grooves, as disclosed and described in said '429 patent.

The sheath 12, fabricated of a vulcanizable material such as synthetic or natural rubbers, suitably compounded in well known fashion, to produce a resilient grip pleasing to ones grasp, is molded over the wired sleeve and vulcanized to produce the laminate shown in FIGS. 1, 2 and 3.

Thus, the internal surface of the sheath 12 is formed with a second continuous pattern of lands 21 and groove 27 threadedly engaging the first pattern of lands 16 and grooves 17 of the sleeve 13.

In view of the threaded relationship between the sheath and the sleeve, there is a risk of relative motion between the sheath and the sleeve in that one element of the handgrip may move relative to the other element in the fashion of a jack screw.

To preclude this occurrence a lock means is incorporated in the handgrip structure in the form of at least one protuberance 23 molded integrally in seamless fashion with the sleeve 13. The protuberance is received in a mating recess 24 in the sheath 12, as is most apparent in FIG. 4.

In the disclosed embodiment of the locking means it takes the form of four protuberances 23 extending radially in the manner of a cross.

Obviously it is within the spirit and scope of the present invention to design or shape single or multiple protuberances in a number of ways as considerations of tool design and economy of manufacture dictate.

It is also within the spirit and scope of the invention to project the protuberance radially inwardly from the sleeve so that the protuberance(s) is received within a recess formed in the sleeve.

In some situations, depending upon the compatability of the respective materials from which the sleeve and the sheath are fabricated, one can rely on thermal fusion between the sleeve and the sheath, after the vulcanization step, to preclude relative motion.

In fact, in some situations the relative motion problem can be overcome by spraying or painting an adhesive material upon the wired sleeve before molding the sheath upon the sleeve.

However, it is to be understood that since the handgrip of the present invention is often used under severe conditions of weather and torsional stress, it is preferred that lock means be incorporated in the handgrip structure to be certain that no relative motion occurs.

It is to be understood that the invention is not limited to the illustrations described and shown herein, which are deemed to be merely illustrative of the best modes of carrying out the invention, and which are susceptible of modification of form, size, arrangement of parts and details of operation. The invention rather is intended to encompass all such modifications which are within its spirit and scope as defined by the claims.

What is claimed is:

1. A hand grip device comprising:
   an inner electrical insulating sleeve,
   an outer protective, electrical insulating sheath,
   a bare heating wire disposed between the sheath and the sleeve,
   the inner sleeve being formed on its exterior surface with a first pattern of continuous helical lands and grooves,
   the outer sheath being formed on its interior surface with a second pattern of continuous helical lands and grooves,
   the land and grooves of the first and second patterns being threadedly engaged whereby said sheath and said sleeve are relatively rotatable and separable, and
   lock means incorporated in said handgrip whereby said relative rotation is precluded.

2. The handgrip device of claim 1 wherein the lock means defines at least one protuberance extending radially from one of said sheath and said sleeve received in a mating recess formed in the other of said sheath and said sleeve.

3. The handgrip device of claim 2 wherein the protuberance element of the lock means defines a unitary seamless piecepart formed integrally with one of said sheath and said sleeve.

4. The device of claim 1 wherein the lock means defines a plurality of radially projecting protuberances, each received in a mating recess.

5. The device of claim 1 wherein the sheath includes a peripheral flange and the protuberance portion of the lock means projects into said flange.

6. The device of claim 4 wherein the protuberances define a cross and are molded integrally in seamless fashion to the sleeve.

* * * * *